United States Patent
Ramanujam (10) Patent No.: US 12,104,570 B2
(45) Date of Patent: Oct. 1, 2024

(54) TURBINE BLADE FOR A WIND TURBINE

(71) Applicant: Siemens Gamesa Renewable Energy A/S, Brande (DK)

(72) Inventor: Giridhar Ramanujam, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/035,768

(22) PCT Filed: Nov. 10, 2021

(86) PCT No.: PCT/EP2021/081281
§ 371 (c)(1),
(2) Date: May 8, 2023

(87) PCT Pub. No.: WO2022/112008
PCT Pub. Date: Jun. 2, 2022

(65) Prior Publication Data
US 2023/0392576 A1    Dec. 7, 2023

(30) Foreign Application Priority Data
Nov. 25, 2020   (EP) ..................................... 20209742

(51) Int. Cl.
*F03D 1/06* (2006.01)
*F03D 80/40* (2016.01)

(52) U.S. Cl.
CPC ......... *F03D 1/0643* (2023.08); *F03D 1/0648* (2023.08); *F03D 80/40* (2016.05); *F05B 2240/303* (2020.08); *F05B 2240/311* (2013.01); *F05B 2280/5001* (2013.01)

(58) Field of Classification Search
CPC ................. F03D 1/0643; F03D 1/0648; F05B 2240/303; F05B 2240/311
See application file for complete search history.

(56) References Cited

U.S. PATENT DOCUMENTS

| 2,539,576 A | 1/1951 | Gregg |
| 2,937,826 A * | 5/1960 | Johnson .................... B64C 3/46 244/134 A |
| 2010/0215494 A1 | 8/2010 | Bech et al. |
| 2015/0098820 A1 | 4/2015 | Dixon et al. |

FOREIGN PATENT DOCUMENTS

| CN | 109779830 A | 5/2019 |
| EP | 1 573 199 A1 | 9/2005 |
| EP | 1 613 860 B1 | 11/2015 |
| EP | 3176077 A1 | 6/2017 |
| WO | 2004/057182 A1 | 7/2004 |
| WO | 2011/161442 A2 | 12/2011 |

OTHER PUBLICATIONS

International Search Report & Written Opinion for PCT/EP2021/081281 issued on Jan. 18, 2022.

* cited by examiner

*Primary Examiner* — Brian O Peters
(74) *Attorney, Agent, or Firm* — Schmeiser, Olsen & Watts LLP (57) ABSTRACT

A turbine blade for a wind turbine is provided, including a blade body with a leading-edge, wherein the blade body is provided with a form changing device covering the leading-edge and extending at least partially along the leading-edge, which form changing device includes a shell fixed to the blade body, which shell is movable by an actuator between a first position close to the leading-edge and a second position distanced to the leading-edge.

12 Claims, 8 Drawing Sheets

TURBINE BLADE FOR A WIND TURBINE

CROSS-REFERENCE TO RELATED APPLICATIONS

This application claims priority to PCT Application No. PCT/EP2021/081281, having a filing date of Nov. 10, 2021, which claims priority to EP Application No. 20209742.4, having a filing date of Nov. 25, 2020, the entire contents both of which are hereby incorporated by reference.

FIELD OF TECHNOLOGY

The following relates to turbine blade for a wind turbine, comprising a blade body with a leading-edge.

BACKGROUND

Wind turbines are used for producing electricity, as commonly known. A turbine comprises a tower, a nacelle on top of the tower and a generator, which is coupled to a hub, to which usually three turbine blades, commonly also known as rotor blades, are attached. The turbine or rotor blades interact with the blowing wind for rotating the hub and driving the generator. The set-up of such a wind turbine and its function is commonly known.

It is also known, see for example EP 1 613 860 B1, to use turbine blades which can be changed in their airfoil geometry for controlling the aerodynamic forces resting on the blade, for example for increasing a lift produced by a blade section or the like. For changing the geometry, usually respective device are provided at the trailing edge of the blade in form of flaps or the like, which may either be add-on items arranged at the blade respective the trailing edge, or which may be integrated in the blade body respectively its trailing edge, as shown in EP 1 613 860 B1.

Also, changing the shape respectively the cross-sectional geometry of the airfoil blade at the leading-edge can influence the aerodynamic parameters, for example for balancing the lift distribution and for reducing the magnitude of the moment imbalance. A shape changing mechanism of the leading-edge of the blade is disclosed in EP 1 613 860 B1. The blade comprises a blade body with an airfoil shape with a leading-edge region, which leading-edge region is part of the blade body. The skin of the leading-edge region and therefore of the respective blade body region is made of rubber or the like. Within the skin in this region one or more sheets of smart material are integrated, which can be actively controlled to move the leading-edge in order to bend it upwards or downwards respectively towards the suction side or towards the pressure side. The respective smart material sheets are arranged in the blade body respectively leading-edge skin at the upper or suction side and the lower or pressure side. Depending on which smart material sheet is controlled to be extended, the blade body leading-edge bends upwards or downwards.

Although this embodiment allows for controlling the airfoil geometry and therefore the aerodynamic characteristics of the blade, the set-up of the blade respectively the blade body is quite complex, as this known system necessitates to build the leading-edge with a material which is flexible enough to be bent, and to integrate the respective smart material sheets into the blade body skin and the respective actuation means. It also necessitates to provide additional structural measures to maintain the mechanical parameters respectively stiffness and rigidity of the blade.

SUMMARY

An aspect relates to an improved turbine blade.

For addressing the aspect, a turbine blade for a wind turbine, comprising a blade body with a leading-edge, is characterized in that the blade body is provided with a form changing device covering the leading-edge and extending at least partially along the leading-edge, which form changing device comprises a shell fixed to the blade body, which shell is movable by an actuation means between a first position close to the leading-edge and a second position distanced to the leading-edge.

The inventive turbine blade comprises a blade body with a trailing edge and a leading-edge, which blade body is, as commonly known, for example made as a fiber compound part made of resin embedded fiber mats for providing the respective mechanical properties of the blade body respectively in the blade body skin or shell. Also, the leading-edge is extremely stiff and rigid due to this set-up. The blade body shell itself therefore is not flexible or changeable in its shape or geometry. In order to allow a change or adaption of the airfoil geometry at the leading-edge region, embodiments of the invention provide a form or shape changing device attached to the blade body, which form changing device covers the leading-edge of the blade body and extends at least partially over the length of the leading-edge. This form changing device thus is an add-on item, which is fixed to the blade body having a usual set-up and having a rounded leading-edge, as commonly known.

As said, the form changing device covers the leading-edge but is used for changing the overall geometry and therefore the aerodynamic properties of the blade in the leading-edge region. To change the geometry, the form changing device comprises a shell fixed to the blade body. This shell covers the leading-edge of the blade body. The shell is coupled to an actuation means, which is adapted to move the shell relative to the blade body respectively the blade body leading-edge covered by the shell. In a first position the shell is positioned close to the leading-edge respectively is fitted to the leading-edge. From this first position the shell can be moved and distanced relative to the leading-edge into a second position, in which it is spaced from the leading-edge and a certain free space is given between the leading-edge and the shell. By moving the shell relative to the blade body respectively the leading-edge, the overall geometry and therefore the aerodynamic properties may be significantly changed. Depending on the current situation it is possible for example to create a positive camber creating an increased lift and to thereby boost power production of the wind turbine under wind speeds below a certain rated wind speed. Alternatively, it is also possible to create a negative camber reducing the lift produced by the blade and to thereby reducing the loads on the turbine what might be beneficial under certain wind conditions especially near the shoulder of the power curve which is a design driver for the blade design. Therefore, the form changing device according to embodiments of the invention provides another degree of freedom to the control mechanism for regulating the power output of the wind turbine and the load levels at the blades respectively the turbine. It is possible to increase the power production before rated power to boost the annual energy production of the turbine, while it can also be used to reduce load levels under certain conditions. It is further possible to use this form changing device for a de-icing purpose, in case ice has built up at the leading-edge region covering the form changing device. By simply actuating the actuation means and moving the shell this ice may be broken and removed.

It is crucial that the shell of the form changing device is moved relative to the stiff blade body respectively leading-edge region by the actuation means. This movement may be a simple linear movement so that the actuation means simply pushes the shell in a linear movement away from the leading-edge region when moving it from the first to the second position. But it may also be a kind of bending movement, in which the actuation means bends the shell upwards or downwards respectively to the suction side or the pressure side of the blade. Certainly, also both movements may be overlaid or simultaneous so that a certain linear and bending movement is applied to the shell. It is obvious that there are several degrees of freedom in regard of the movement respectively the direction of the movement and therefore the overall cross-sectional shape and aerodynamic geometry.

According to a first embodiment, the shell is fixed with both longitudinal ends to a suction side surface and a pressure side surface of the blade body and comprises at least one elastic section being extended when the shell is moved from the first to the second position. The shell covering the leading-edge is fixed with both ends to the blade body, the upper and lower respective suction and pressure side so that the shell is firmly attached to the blade body while covering the leading-edge over the length of the shell. An air-tight transition from the shell to the blade body is desirable at both longitudinal end regions. For allowing the movement of the shell relative to the blade body initiated by the actuation means, the shell comprises at least one elastic section, which means that the shell itself is at least in a certain part elastic respectively made of an elastic material. This elastic section is extended or stretched when the shell is moved out of the first position by the actuation means. The shell is still fixed with both ends and therefore the leading-edge is still enclosed or encapsulated by the shell, while the shell is changed in its shape. By extending and stretching the elastic section, a restoring force is generated due to the elastic properties of the elastic section, which assures that the shell respectively the extended elastic part will return to its unstretched shape when the actuation means retracts the shell again from the second to the first position. As the shell comprises at least one elastic section, it is to be mentioned that the remaining section or sections of the shell are non-elastic respectively stiff or way stiffer than the elastic section.

In a further embodiment of this alternative, the shell may comprise a first elastic section close to or fixed to the suction side surface and a second elastic section close to or fixed to the pressure side surface and a stiffer third section connecting the first and the second elastic section. In this embodiment, the first and the second elastic sections are extended or stretched when the shell is moved out of the first position. Both elastic sections are connected by a third section which is stiffer or completely stiff and rigid, and which is correspondingly bended according to the shape of the leading-edge. The actuation means may for example be coupled to this stiff third section and push the same for moving the shell respectively changing the shell geometry. The shell respectively the elastic sections are directly fixed to the blade body by respective fixation elements while it is certainly possible that each first and second elastic section is connection to a stiffer connecting section by which the shell is connected to the blade body.

In an alternative to this embodiment, the shell may comprise a first stiffer section close to or fixed to the suction side surface and a second stiffer section fixed to the pressure side surface and an elastic section connecting the first and the second stiffer section. In this embodiment the middle section, i.e., the elastic third section is stretched when the shell is moved respectively changed in its geometry. The stiffer sections at the longitudinal ends of the shell are tightly fixed to the blade body by respective fixation means and are not moved, only the elastic middle section is stretched. Also, this embodiment allows for a significant change of the shell geometry and therefore the blade geometry.

In a third embodiment, the shell is fixed with both longitudinal ends to a suction side surface and a pressure side surface and is completely elastic. In this embodiment, the shell does not comprise a stiff section, optionally except maybe for two small longitudinal connection sections arranged at the ends of the elastic shell for connecting it to the blade body. The shell is completely stretched over its entire area when the actuation means moves it from the first to the second position and therefore changes its geometry. So, here the shell is completely made from an elastic material and not only in part as at the previous embodiments, where the shell is also made in sections from a stiffer or non-elastic material.

As mentioned, the shell, no matter how it is set up, is firmly fixed to the blade body with both longitudinal ends. This fixation may be realized in various forms. For example, the shell may be fixed to the blade body by respective fixation means like bolts or screws. In an embodiment, the shell is fixed by gluing it to the blade body using a respective glue or resin which allows for a very firm attachment with a smooth transition from the shell to the blade body, what is advantageous in view of the aerodynamic properties.

The previously described embodiments refer to shells which are fixed with both longitudinal ends to the blade body, and which are at least in part or completely elastic, which elasticity allows for changing the shell form or shape by stretching it. An alternative embodiment to this at least partial or complete elastic shell proposes that the shell is stiff and is pivotably fixed with only one longitudinal end to either the suction side surface or the pressure side surface. In this embodiment the shell is stiff and rigid and built from a respective material with no relevant elastic properties. So, when moved from the first to the second position the general geometry or shape of the shell does not change, but the position of the shell relative to the leading-edge is changed by pivoting it. For allowing this pivot movement, the stiff shell is fixed to the blade body at only one longitudinal end, which fixation provides a kind of pivot axis around which the shell can be swivelled when the actuation means moves it out of the first position. In an embodiment, the shell is fixed to the suction side of the blade and therefore is lifted from the pressure side with the other unfixed end, which rests in the first position at the pressure side. If need be, the arrangement can also be vice versa, and the shell may be fixed to the pressure side.

So, embodiments of the invention cover two major shell embodiments, the first comprising a shell with at least one elastic section and at least one stiff section, or with a completely elastic shell, and the second alternative with a completely stiff and rigid but pivotable shell. An elastic section of the shell or the overall elastic shell may, according to embodiments of the invention, be made of mat-like or foil-like elastic polymer-based material, for example an elastomer or rubber material. A stiff section or the overall stiff shell may be made of a rigid polymer-based material with or without integrated fibers. This section or sections or this overall shell may for example be made of resin, for example with embedded glass or carbon fibers. It may therefore be only made of the polymer matrix material or be made as a fiber compound item. It is to be noted that the above-mentioned materials are not restricting but are only examples, as various elastic and non-elastic materials are suited to be used for building a respective shell.

As mentioned, the actuation means is used for and adapted to move the shell. In a first embodiment the actuation means may be a pneumatic or hydraulic actuation means. It is coupled to a respective pneumatic or hydraulic circuit comprising a pump and for example a hydraulic fluid reservoir or the like. In an embodiment, the actuation means, especially the pneumatic actuation means, comprises at least one inflatable bladder arranged between the blade body and the shell. This bladder may be inflated for example with a gaseous medium, air. As it is arranged between the blade body and the shell, the shell is moved when the bladder is inflated from the first to the second position and returns to the first position when the bladder is deflated. This restoring movement back to the first position may either be caused by the extended and stretched elastic material of the shell, or in case of a completely stiff or rigid shell by certain retraction elements like springs or by the bladder itself in case it if firmly fixed to the shell. Using such a bladder or several bladders is very advantageous, as a gas or air may be used to inflate and deflate them, which does not add any weight to the blade. Further, the bladder can completely collapse when being deflated so that it is ascertained that the shell will always return from the second position way back to the first position.

In a further embodiment of this bladder arrangement, it is possible that two or more bladders are arranged side by side seen from the suction side to the pressure side, each bladder being separately inflatable. This actuation mechanism or arrangement allows to widely change the overall geometry of the shell and therefore the blade leading-edge region by separately inflating or deflating one or more of the several bladders. For example, three bladders may be arranged, one closer to the suction side, one at the leading-edge tip and one closer to the pressure side. Depending on which bladder is inflated, an extension or bending deformation may be realized for widely changing the overall cross-sectional shape. This allows for even reducing the lift produced by the blade section thereby acting like a leading-edge spoiler device, for example by only inflating the bladder close to the suction side of the blade, while certainly also other effects may be realized.

Additionally, or alternatively, it is possible that two or more bladders are arranged spaced from each other seen in lengthwise direction of the blade body, each bladder being separately inflatable. In this embodiment, two or more separate bladders are locally distributed along the length of the area covered by the shell. Each of these separate local bladders is separately inflatable. This actuation mechanism allows for varying the geometry in the spanwise direction which can lead to different levels and geometries of actuation at different positions along the leading-edge. It therefore allows to locally change the geometry, seen in lengthwise or spanwise direction, as the, in this embodiment, flexible or elastic shell is only locally extended and moved from its position close to the leading-edge. When the bladders, which are spaced apart seen in lengthwise direction, are inflated the leading-edge is provided with a kind of tubercles extending at or around the leading-edge, which tubercles are known to reduce noise and increase the aerodynamic performance. The more separate inflatable bladders are arranged along the leading-edge between the blade body and the elastic shell or the elastic part of the shell, the more tubercles may be provided. It needs to be noted that this arrangement may also be coupled with the previous arrangement comprising several neighbouring bladders seen from the suction side to the pressure side, allowing for either realizing the kind of tubercles and/or for moving the complete shell along its length partly or completely.

In an alternative to using one or more bladders, the actuation means may also comprise one or more positioning cylinders comprising a movable piston connected to the shell. The one or the several cylinders are arranged at the blade body with the pistons being connected to the shell. When a piston is moved out of the non-movable cylinder, the shell is moved, no matter how the shell set-up is. In an embodiment, the cylinders are simultaneously controllable, while it is certainly possible that each cylinder may be separately controlled to have a further degree of freedom in changing the shell shape.

In an alternative, it is possible that the actuation means may comprise one or more push rods connected to the shell, which push rods are movable by an electric drive like an electric motor. For example, the push rod may be part of an electric spindle drive having a rotating nut, which is driven by the electric drive, while the spindle moves through the rotating nut. The spindle is coupled to the shell, which may be moved by the longitudinally moving spindle. In an alternative the push rod may also be coupled to an electric eccentrical drive. The push rod is for example eccentrically fixed to a rotating disc, which is rotated by the electric drive. Due to this eccentric arrangement, the push rod is moved when the disc rotates, thereby moving the shell.

While it is possible that the shell may only move between the edge-close first position and the extended or distanced second position, it is certainly possible that the actuation means is adapted to move and fix the shell into one or more intermediate positions or in any intermediate position between the first and the second position. This means that the first and the second position define maximum or end positions, while any intermediate position in between may also be controlled and fixed by the actuation means.

Finally, embodiments of the invention also relate to a wind turbine comprising one or more turbine blades according to the previous description.

BRIEF DESCRIPTION

Some of the embodiments will be described in detail, with reference to the following figures, wherein like designations denote like members, wherein.

DETAILED DESCRIPTION

Figure 1:
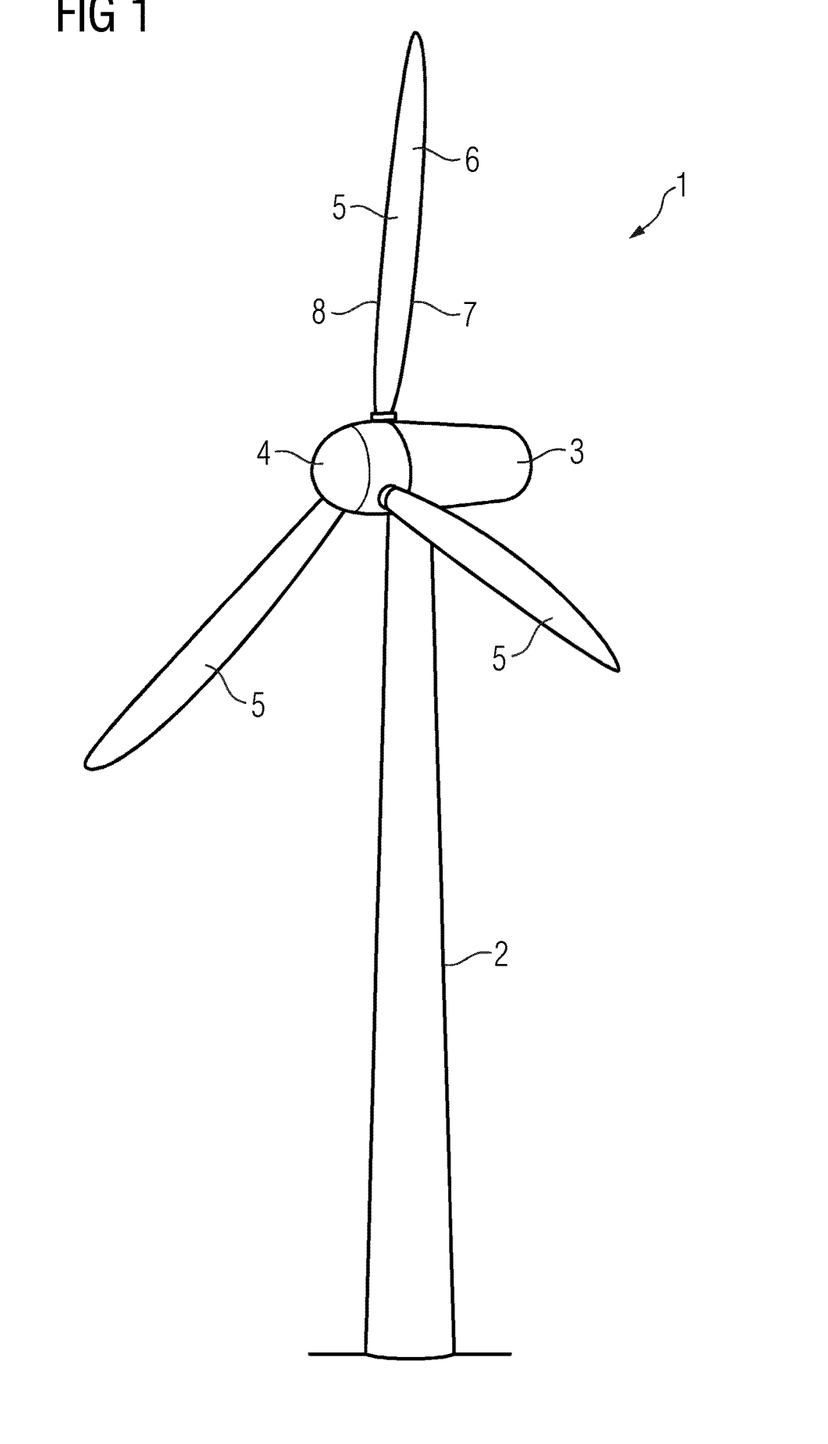
FIG. 1 shows a schematic illustration of an inventive wind turbine.

FIG. 1 shows a principle illustration of an inventive wind turbine 1 comprising a tower 2 with a nacelle 3 arranged to the top of the tower. The nacelle comprises a hub 4 to which in this embodiment three turbine blades 5, which can also be named as rotor blades, are attached. The turbine blades 5 interact with the blowing wind thereby rotating the hub 4. The hub is coupled to a generator which is driven by the rotating hub thereby producing electricity, as commonly known.

Each turbine blade comprises a blade body 6 with a leading-edge 7a and a trailing edge 7b. The blade body is usually made as a hollow construction comprising a blade body shell made of a fiber re-inforced polymer, thus the blade body is a fiber compound item with several fiber mats embedded in a resin matrix. The blade body is stiffened by respective webs arranged in its inner, as also commonly known.

Each inventive turbine blade 5 is characterized by having a specific form changing device arranged at the blade body at the leading-edge. FIGS. 2-13 show various embodiments of such a form changing device which allows to change the geometry of the turbine blade 5 in the leading-edge region thereby changing the aerodynamic properties of each respective turbine blade 5.

Figure 3:
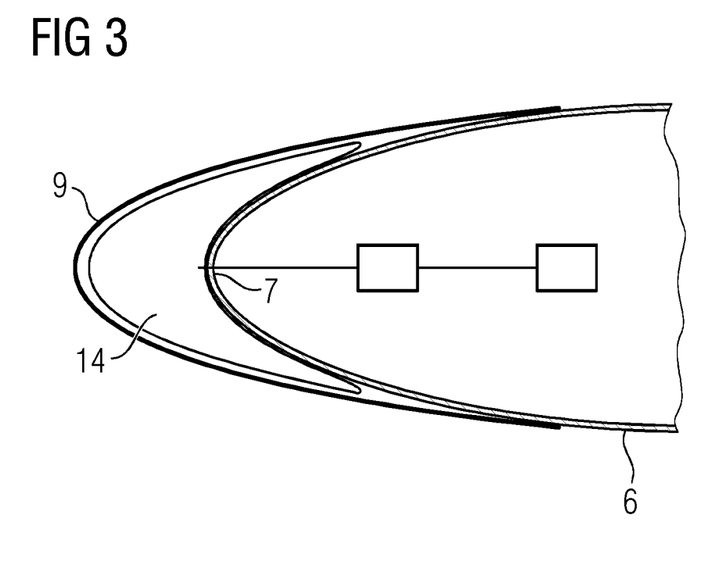
FIG. 3 the embodiment of FIG. 2 with the form changing device in the second position.

FIG. 3 shows a first embodiment of a turbine blade 5 as a partial view in a cross-section. The view shows the leading-edge 7 realized at the respective blade body 6 which is as shown a hollow body. Attached to the blade body 6 is a form changing device 8 which comprises a shell 9 which is fixed with both longitudinal ends 10 to the blade body 6. This fixation may be realized by separate fixation means like screws or bolts or the like or in an alternative embodiment by a gluing or sticking agent which firmly glues the shell 9 to the blade body. Such a glue may for example be a cured resin fixing or embedding the respective longitudinal end 10 to the blade body 6.

The shell 9 in this embodiment is made in form of a mat or foil completely made from an elastic material like an elastic polymer-based material, which material is adapted to be stretched and which automatically changes its shape back to the starting or initial position resulting from a restoring force being built up within the elastic material when being stretched. The shell 9 obviously is attached with one end to the suction side 11 of the blade body 6 and with the other end to the pressure side 12 of the blade body 6 so that the mat- or foil-like shell 9 covers the whole leading-edge 7a. It also extends at least partially along the length of the leading-edge 7a seen in the lengthwise direction of the turbine blade 5 so that it covers the leading-edge 7a over a remarkable part of its length.

Figure 2:
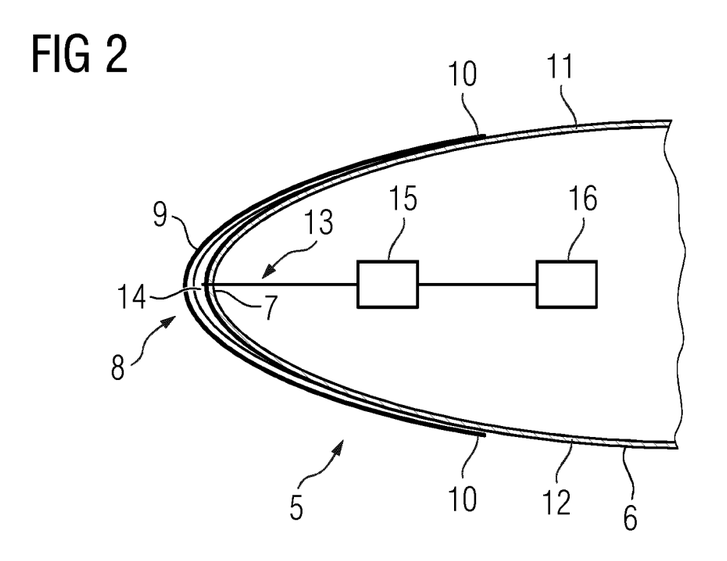
FIG. 2 shows a principle sketch of a part of an inventive turbine blade in a cross-sectional view with a form changing device in the first position.

The turbine blade 5 further comprises an actuation means or actuator 13 which is adapted to move the shell 9 from a first position shown in FIG. 2, where it is very close to the blade body 6 respectively the leading-edge 7a, to a second position as shown in FIG. 3, where it is distanced from the leading-edge 7a. This actuation means or actuator 13 in this example is a pneumatic actuation means or actuator which comprises at least one inflatable bladder 14 arranged between the blade body 6 and the shell 9, as shown in FIGS. 2 and 3. This inflatable bladder 14 is coupled to a pump 15 which is controlled by a control device 16. It is to be noted that along the length of the longitudinal edge 7a respectively the shell 9, more than one bladder 14 may be arranged, while also only a single, long bladder 14 may be provided.

If the overall geometry respectively aerodynamic airfoil shape of the turbine blade 5 shall be changed in order to, for example, control the produced power or the like, the control device 16 controls the pump 15 to inflate the bladder 14 so that it changes its shape and form and stretches the elastic shell 9, as shown in FIG. 3. As the elastic shell 9 is fixed to the blade body 6, it is stretched depending on the cross-sectional shape of the bladder 14 which obviously extends from the suction side 11 to the pressure side 12 covering the leading-edge 7a. As FIGS. 2 and 3 clearly show, the width of the blade 5 may be changed due to the change at the leading-edge 7a thereby influencing the aerodynamic properties.

If this form change is no longer needed, the control device 16 controls the pump 15 or a deflation valve or the like to deflate the bladder 14 resulting in another form change. The stretched elastic shell 9 returns from the second position according to FIG. 3 in the first position according to FIG. 2 and thereby also the cross-sectional form of the turbine blade 5 changes again.

It is to be noted that between the first and the second positions shown in FIGS. 2 and 3, one or more intermediate positions may be controlled depending on the extent the bladder 14 is inflated.

Figure 4:
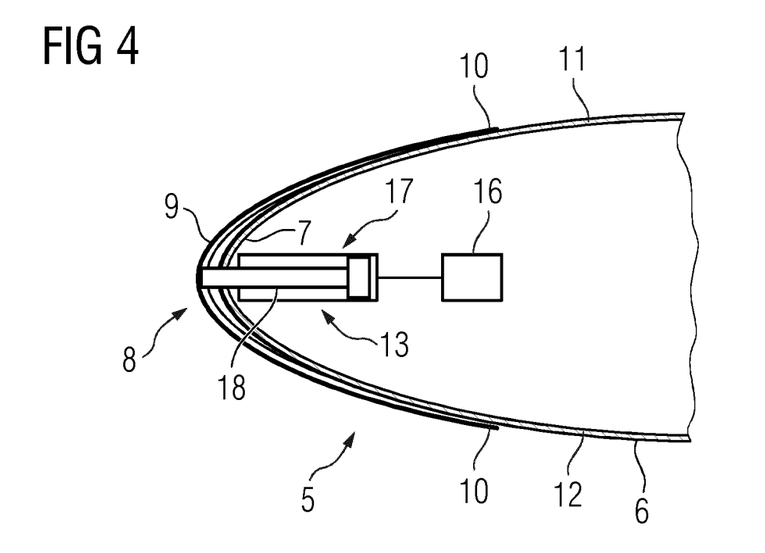
FIG. 4 shows a second embodiment of an inventive wind turbine with the form changing device in the first position.
Figure 5:
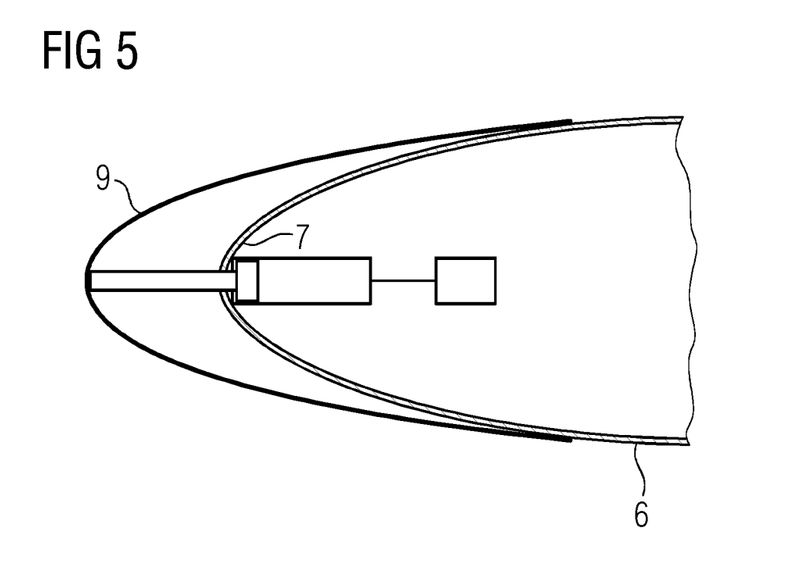
FIG. 5 shows the embodiment of FIG. 4 with the form changing device in the second position.

FIGS. 4 and 5 show another embodiment of an inventive turbine blade 5, with the same reference numbers being used for the same items throughout the following description of all figures. FIGS. 4 and 5 again show a blade body 6 to which a form changing device 8 comprising an overall elastic shell 9 is attached along its longitudinal ends 10. It again covers the leading-edge 7aa from the suction side 11 to the pressure side 12 and also over a remarkable length of the leading-edge 7a.

In this embodiment a different actuation means or actuator 13 is provided. This actuation means or actuator 13 comprises one or more positioning cylinders 17 controlled by control device 16. The or each cylinder 17 comprises a piston 18 which can be linearly moved, as shown in FIGS. 4 and 5. The or each piston 18 is coupled to the elastic shell 9. For this coupling the end or tip of the piston 18 may be provided with a kind of rounded coupling means corresponding somehow to the shape of the leading-edge 7a and thus the elastic shell 9, so that the force acting on the elastic shell 9 is distributed over a larger and geometrically defined area.

If the form of the turbine blade 5 shall be changed, the control device controls the or each positioning cylinder 17 so that the respective piston 18 is moved out of the cylinder 17 thereby stretching the elastic shell 9 from the first position according to FIG. 4 to the second position according to FIG. 5, where it obviously severely changes the overall shape of the turbine blade 5 in the leading-edge region.

If the form change shall be reversed again the control device 16 controls the or each positioning cylinder 17 to retract the respective piston 18 so that it is moved back into the cylinder 17 which movement is supported by the restoring force of the stretched elastic shell 9.

As the mat- or foil-like shell 9 extends over a remarkable length of the leading-edge 7a usually more than one cylinders 17 are provided which may be coupled to a common connection device connecting the pistons 18 to the elastic shell 9. Each cylinder 17 may be controlled separately or over a common control device 16.

Figure 7:
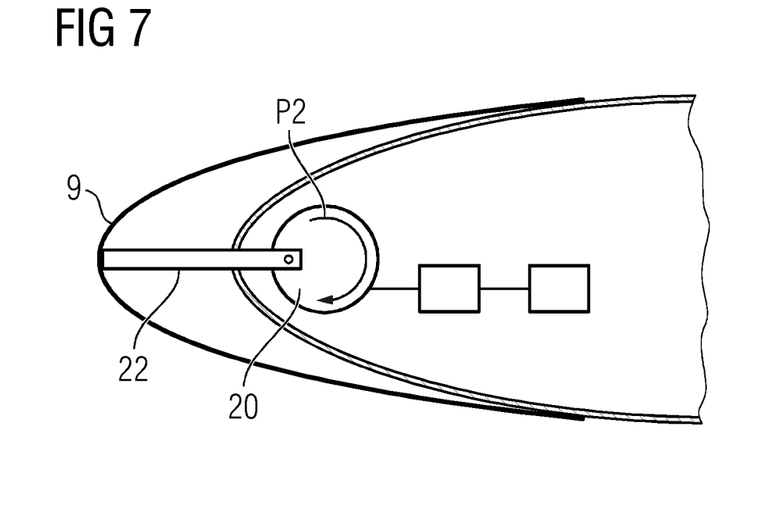
FIG. 7 shows the embodiment of FIG. 6 with the form changing device in the second position.

FIG. 7 shows a third embodiment of an inventive turbine blade 5 again comprising a blade body 6 with a leading-edge 7, to which a form changing device 8 comprising an overall elastic mat- or foil-like shell 9 fixed with its longitudinal ends 10 to the blade body 6 at its suction side 11 and pressure 12. Compared to the previous first and second embodiment, in this third embodiment again a different actuation means 13 is provided. This actuation means or actuator comprises an eccentrical electric drive 19 with a rotating disc 20 and an electric motor 21 controlled by the control device 16. The rotating disc 20 rotates around a fixed rotation axis as shown by the arrow P1 and is coupled by a push rod 22 to the shell 9. The push rod 22 is eccentrically arranged at the disc 21. Again, also in this embodiment a connecting device may be positioned at the tip of the push rod 22, whereby several push rods may be arranged along the length of the leading-edge 7.

Figure 6:
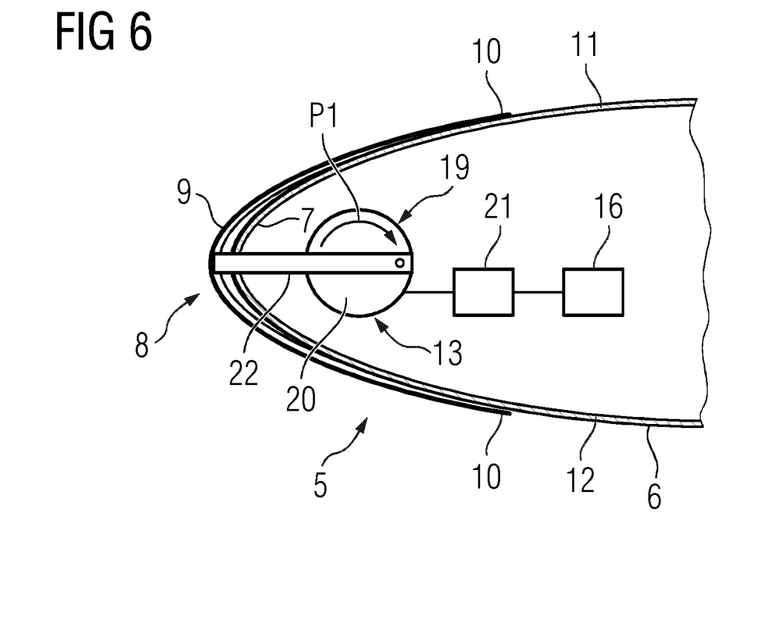
FIG. 6 shows a third inventive embodiment of a turbine blade with the form changing device in the first position.

In FIG. 6, the shell 9 is arranged in the first position close to the blade body 6 respectively the leading-edge region. The push rod 22 is in the retracted position. When now rotating the rotation disc 20 as show by the arrow P1, the push rod 22 is moved due to the eccentric fixation at the rotating disc 20. Thereby the elastic shell 9 is stretched as shown in FIG. 7. The aerodynamic airfoil cross-section of the blade 5 is changed. When reversing this form change, the rotation disc is again rotated as shown by arrow P2, which shows in the same rotational direction as arrow P1. During this rotation, the push rod 22 is retracted thereby also retracting the elastic shell 9 which supports this reverse movement by its inherent restoring force.

Figure 8:
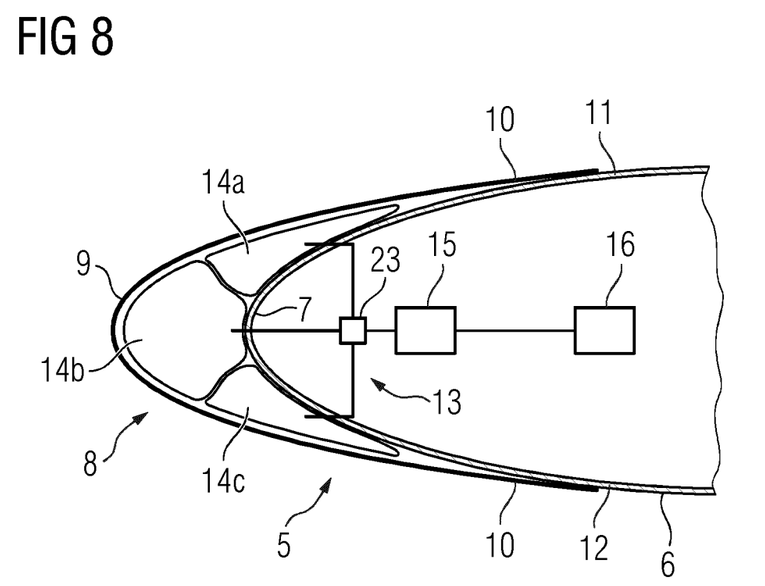
FIG. 8 shows a fourth embodiment of the invention with a segmented form changing device in the second position.

FIG. 8 shows a fourth embodiment of an inventive turbine blade 5 with a blade body 6 and a leading-edge 7, to which again a form changing device 8 comprising an overall elastic foil- or mat-like shell 9 is attached along its longitudinal ends 10 to the suction side 11 and the pressure side 12. This embodiment is comparable to the embodiment of FIG. 3 in regard of the actuation means 13. This actuation means 13 in this embodiment comprises, for example, three bladders 14a, 14b and 14c arranged side by side seen from the suction side 11 to the pressure side 12, each bladder 14a, 14b, 14c being separately inflatable by the pump 15 controlled by the control device 16. A valve 23 may be provided to separately control each bladder 14a, 14b, 14c. This mechanism can furthermore define the degrees of freedom in which the form change may be performed. It is possible to asymmetrically shape the leading-edge region depending on which bladder or bladder combination is inflated. It is possible to only inflate for example bladder 14a but none of the other two bladders. It is also possible to only inflate bladder 14b, or only bladder 14c. Also, two bladders like the bladders 14a and 14b may be inflated, but not the bladder 14c etc. It is obvious that there are several variations to modify the cross-sectional shape by the multiple sub-units in form of the separate bladders 14a, 14b, 14c.

Figure 9:
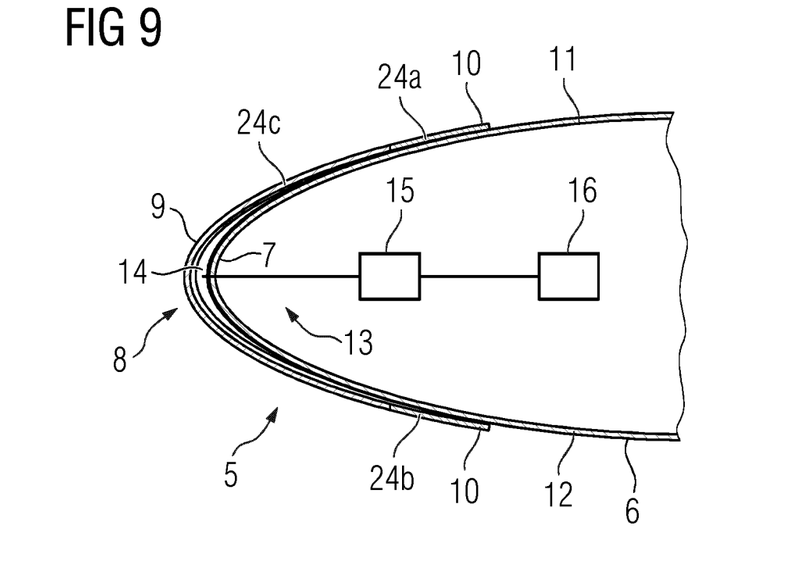
FIG. 9 shows a fifth embodiment of the invention with a form changing device in the first position.
Figure 10:
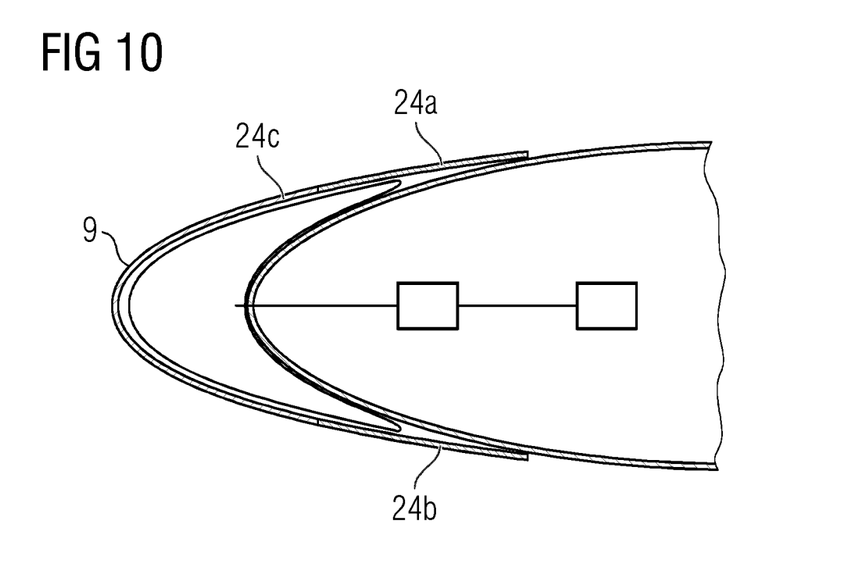
FIG. 10 shows the embodiment of FIG. 9 with the form changing device in the second position.

FIGS. 9 and 10 show an inventive turbine blade 5 which corresponds in regard to the actuation means 13 to the embodiment of FIGS. 2 and 3. Again, the turbine blade 5 comprises a blade body 6, to which the form changing means 8 comprising a shell 9 is attached along its longitudinal ends 10. Between the leading-edge 7a respectively the leading-edge region and the shell 9 again at least one inflatable bladder 14 is arranged and coupled to a pump 15 which is controlled by the control device 16. In this embodiment, the shell 9 is not completely made of an elastic material, but only in sections. It comprises a first elastic section 24a with a first longitudinal edge 10 connected to the suction side 11 and a second elastic section 24b with a second longitudinal edge fixed to the pressure side 12. Between these two elastic sections 24a, 24b, which are made of a mat- or foil-like elastic material like a polymer, a stiffer third section 24c having a rigid shape is arranged which is fixed or connected with the elastic sections 24a, 24b. This stiff section 24c may be made of a rigid polymer or polymer compound and helps to provide a stiff surface in the region near the erosion zone of the leading-edge 7a protecting the blade body 6.

When the form shall be changed, the bladder 14 is inflated so that the shell 9 is expanded and moved from the first position according to FIG. 9 to the second position according to FIG. 10. By doing so only the two elastic sections 24a, 24b are stretched, while the third stiff or rigid middle section 24c is not changed in its shape. Again, when the form change shall be reversed again, it is only necessary to deflate the bladder 14 so that the stretched elastic sections 24a, 24b retract the stiff section 24c back to the first position.

As a remark, the embodiment shown in FIGS. 9 and 10 may also be vice versa in regard to the stiffness and elasticity of the sections 24a, 24b and 24c. It is certainly also possible to have the sections 24a, 24b being stiffer than the elastic or flexible intermediate third section 24c. Again, the shell 9 comprises three separate sections, but it is stiff at the longitudinal edge regions, but flexible in the middle. When the bladder 14 is inflated, the elastic middle section 24c is extended and stretched, while the stiffer sections 24a, 24b remain unchanged in their shape.

Figure 11:
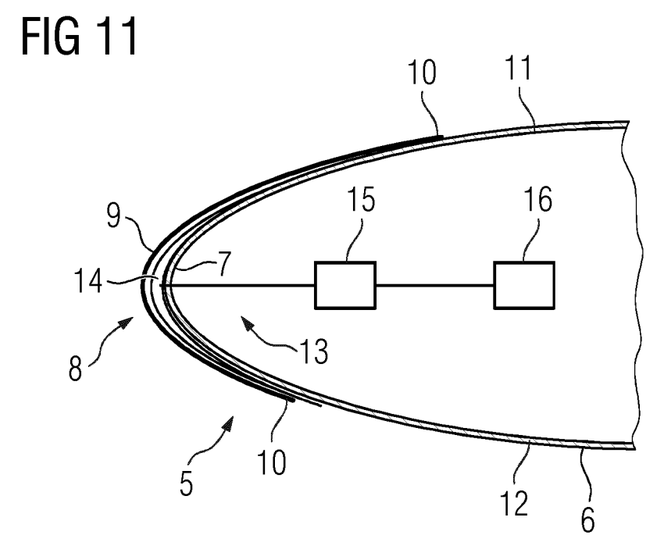
FIG. 11 shows a sixth embodiment of an inventive turbine blade with the form changing device in the first position.

The embodiment of FIG. 11 shows a sixth embodiment of a turbine blade 5 comprising a blade body 6 with a leading-edge 7a which again is covered by a form changing means 8. This form changing means 8 again comprises a shell 9, but here the shell 9 is attached with only one longitudinal edge 10 to the suction side 11. The other longitudinal edge 10 is not fixed to the blade body 6.

Again, in this embodiment actuation means 13 comprises an inflatable bladder 14 coupled to a pump 15 controllable by a control device 16. The arrangement of the shell 9 to the blade body 6 is in a hinged manner so that the shell 9 may be swiveled around its fixation axis at the longitudinal edge 10. For changing the shape, the bladder 14 is inflated and widens. This makes the shell 9, which in this embodiment is stiff and rigid, to swivel around its fixation along the longitudinal edge 10 so that it is somehow bent towards the suction side 11. The lower longitudinal edge 10 is moved a little away from the blade body 6 respectively the pressure side 12 as FIG. 12 clearly shows.

Figure 12:
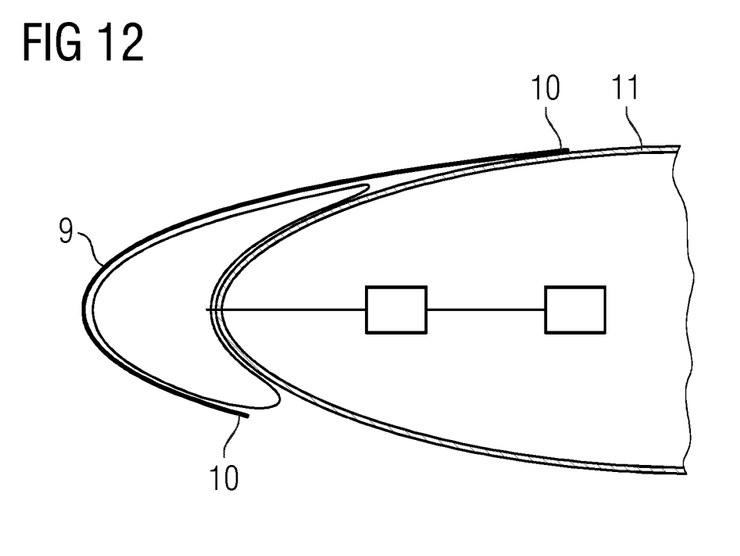
FIG. 12 shows the embodiment of FIG. 11 with the form changing device in the second position.

In this embodiment, the bladder 14 may be firmly fixed to the shell 9, which as mentioned is stiff and therefore does not build up any restoring force when being moved from the first to the second position. For reversing the movement, when the bladder 14 is deflated, the collapsing bladder 14 retracts the stiff shell 9 and takes it back to its first position close to the leading-edge.

Figure 13:
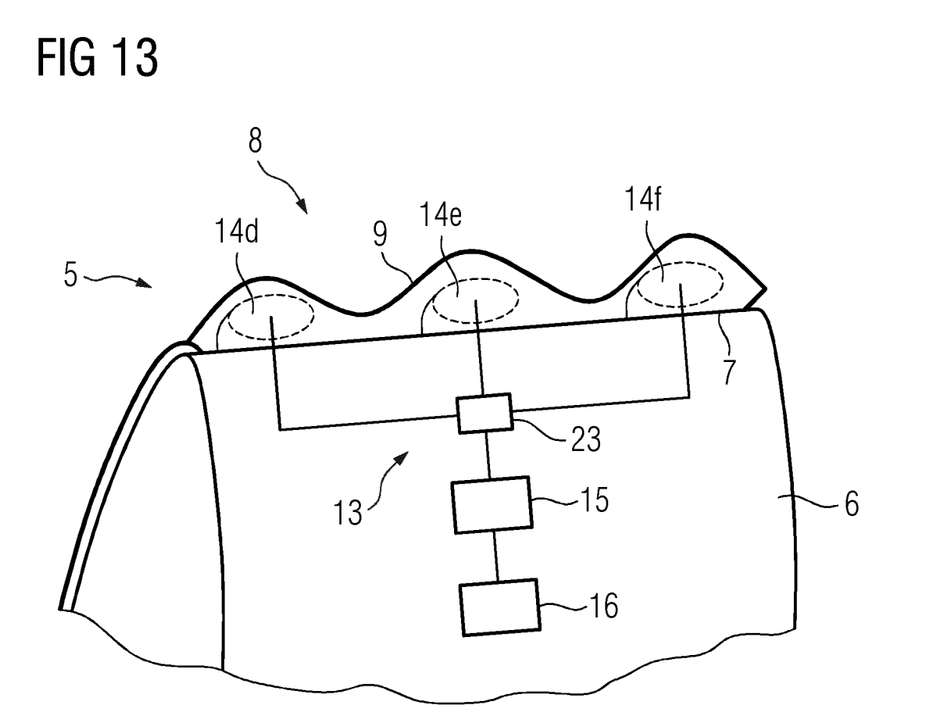
FIG. 13 shows a seventh embodiment of an inventive turbine blade with the form changing device in the second position.

Finally, FIG. 13 shows an embodiment of a turbine blade 5 having a blade body 6 to which again a form changing means 8 comprising a shell 9 is attached in a way as previously mentioned. Also in this embodiment the shell 9 is completely elastic and fixed with both longitudinal ends 10 to the blade body 6.

Here, the actuation means 13 comprises several separate bladders 14d, 14e and 14f, which are arranged spaced from each other seen in lengthwise direction of the blade body, each bladder 14*d*, 14*e*, 14*f* being separately inflatable. They are coupled to a pump 15 which is controlled by the control device 16. Again a controllable valve 23 may be provided to separately control each bladder 14*d*, 14*e*, 14*f*.

This embodiment is designed in such a way that, apart from varying the actuation along the chordwise direction as depicted by the multiple chamber bladder arrangement according to FIG. 8, also a variation in a spanwise direction can be performed, as the bladders 14*d*, 14*e*, 14*f* are distributed along the length and extend around of the leading-edge 7, thus in spanwise direction. This allows to produce protruding areas along the leading-edge 7*a* which protrusions are like tubercles extending from the longitudinal edge 7*a* and thereby stretching the elastic shell 9 only locally. FIG. 13 shows a principle illustration of this embodiment clearly showing that each separate bladder 14*d*, 14*e*, 14*f* produces a separate protrusion or tubercle. This kind of form change allows to reduce noise and increase aerodynamic performance.

Embodiments of the invention add another degree of freedom for controlling or regulating the power output and the load levels of a wind turbine. It is possible to increase the power production before rated power to boost the annual energy production of the turbine, while it may also be possible to reduce load levels under certain conditions. Also, a de-icing is possible if an ice shield has built up on the blade surface by simply moving the shell 9 which breaks the ice shield—Also the aero-acoustic noise emission may be reduced. All this is feasible due to the arrangement of the form changing means 8 covering the leading-edge 7*a* and changing the overall edge form or shape as previously discussed. Any movement of the respective shell 9 results in a shape change, which results in a change of the aerodynamic properties. In an embodiment, not only a first and a second position may be controlled, but also intermediate positions, there is a wide variety of forms or shapes which may be controlled, and which allow to specifically control e.g., the power output and load levels.

For example, actuating the device to create a positive camber can create an increased lift and thereby boost power production of the wind turbine under wind speeds below rated wind speed. Alternatively, actuating the device to create a negative camber can reduce the lift produced by the blade and thereby reduce the loads of the turbine which might beneficial under certain wind conditions, especially near the shoulder of the power curve which is a design driver for the blade design.

Actuating the segment just below the leading-edge only can create a sharper leading-edge and increase short length which can increase the lift over drag ratio under nominal operation conditions leading to AEP improvements.

Actuating the form changing means in a certain manner may also cause an increase in leading-edge radius increasing the robustness of the blade section to soiling and other surface impurities if required by the original blade design.

The actuation varying in the spanwise direction may also create features like tubercles which can help to reduce noise emission in certain operation conditions. The tubercle-like features can also act like vortex generators helping to increase the robustness towards soiling, inflow turbulences, shear and other inflow conditions.

Finally, the periodic activation and deactivation of the device can also surf as a de-icing mechanism helping to remove an ice shield accumulated over the leading-edge.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A turbine blade for a wind turbine, comprising a blade body with a leading-edge, wherein the blade body is provided with a form changing device covering the leading-edge and extending at least partially along the leading-edge, which form changing device comprises a shell fixed to the blade body, which shell is movable by an actuator between a first position adjacent to the leading-edge and a second position distanced to the leading-edge, wherein the shell is fixed with both longitudinal ends to a suction side surface and a pressure side surface of the blade body and comprises an elastic section being extended when the shell is moved from the first to the second position, wherein the shell comprises a first stiff section adjacent to or fixed to the suction side surface and a second stiff section fixed to the pressure side surface, and wherein the elastic section connects the first stiff section and the second stiff section; and wherein when the actuator is actuated, the elastic section is extended and stretched while respective shapes of the first stiff section and the second stiff section are unchanged.

2. The turbine blade according to claim 1, wherein the shell is fixed with both longitudinal ends to a suction side surface and a pressure side surface and is completely elastic.

3. The turbine blade according to claim 1, wherein the elastic section of the shell is made of mat-like or foil-like elastic polymer based material, while the stiff section is made of rigid polymer based material with or without integrated fibers.

4. The turbine blade according to claim 1, wherein the actuator is a pneumatic or hydraulic actuator.

5. The turbine blade according to claim 4, wherein the actuator comprises at least one inflatable bladder arranged between the blade body and the shell.

6. The turbine blade according to claim 5, wherein two or more bladders are arranged side by side seen from the suction side to the pressure side, each bladder being separately inflatable, and/or that two or more bladders are arranged spaced from each other seen in lengthwise direction of the blade body, each bladder being separately inflatable.

7. The turbine blade according to claim 4, wherein the actuator comprises one or more positioning cylinders comprising a movable piston connected to the shell.

8. The turbine blade according to claim 1, wherein the actuator comprises one or more push rods connected to the shell and movable by an electric drive.

9. The turbine blade according to claim 8, wherein the push rod is part of an electric spindle drive or is coupled to an electric eccentrical drive.

10. The turbine blade according to claim 1, wherein the actuator is configured to move the shell in one or more defined intermediate positions or in any intermediate position between the first and the second position.

11. A wind turbine comprising one or more turbine blades according to claim 1.

12. A turbine blade for a wind turbine, comprising a blade body with a leading-edge, wherein the blade body is provided with a form changing device covering the leading-edge and extending at least partially along the leading-edge, wherein the form changing device comprises a shell fixed to the blade body, wherein the shell is movable by an actuator between a first position adjacent to the leading-edge and a second position distanced to the leading-edge, wherein the shell is fixed with both longitudinal ends to a suction side surface and a pressure side surface of the blade body and comprises a first elastic section adjacent to or fixed to the suction side surface and a second elastic section fixed to the pressure side surface, and wherein the shell comprises a first stiff section connecting the first elastic section and the second elastic section; wherein when the actuator is actuated, the elastic section and the second elastic section are stretched while a shape of the stiff section is unchanged.

* * * * *